June 9, 1953 M. VALOIS 2,641,505
POWER SPRAYER FOR CHEMICAL HERBICIDES
Filed Dec. 3, 1948 5 Sheets-Sheet 1

INVENTOR.
MOORE VALOIS
BY
Jerome W Paxton
Agent.

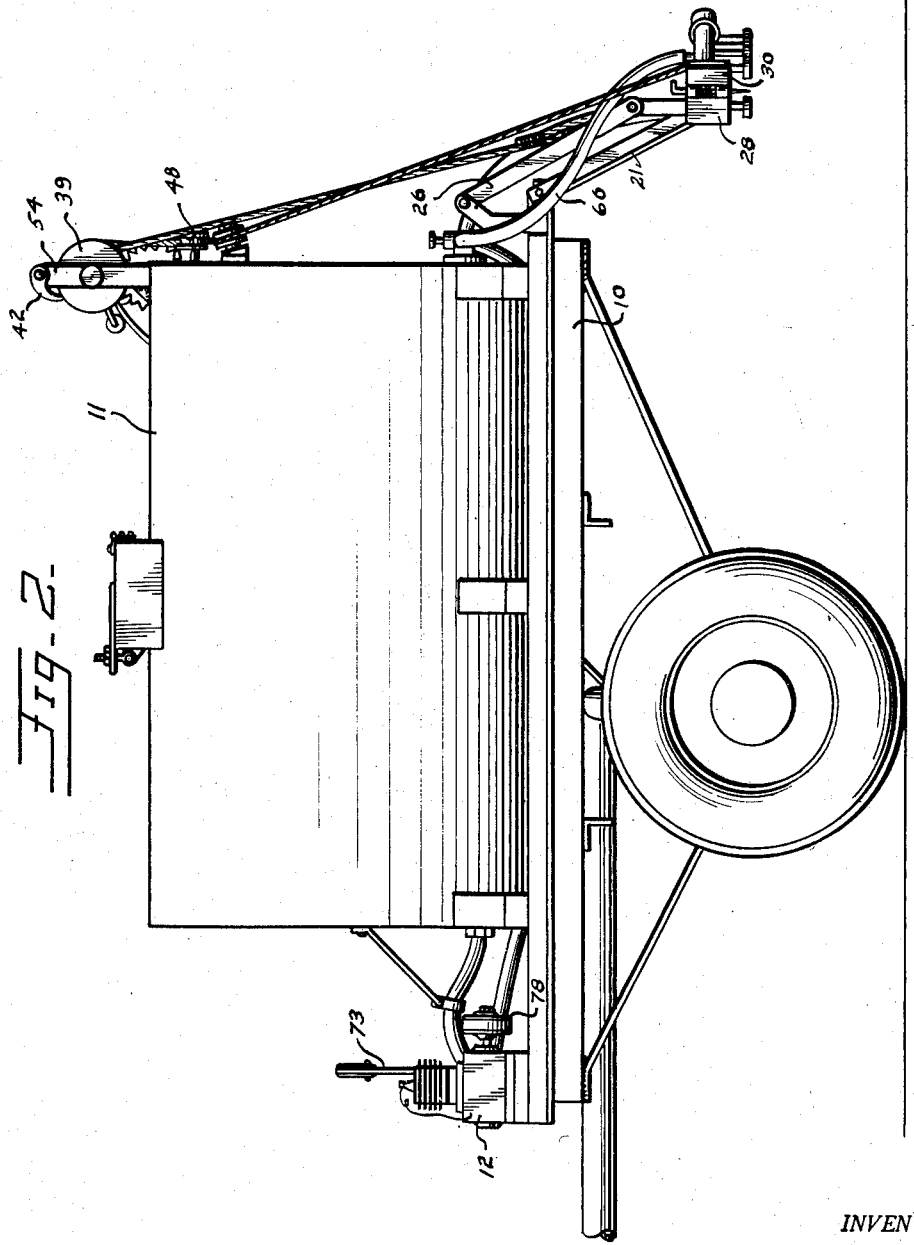

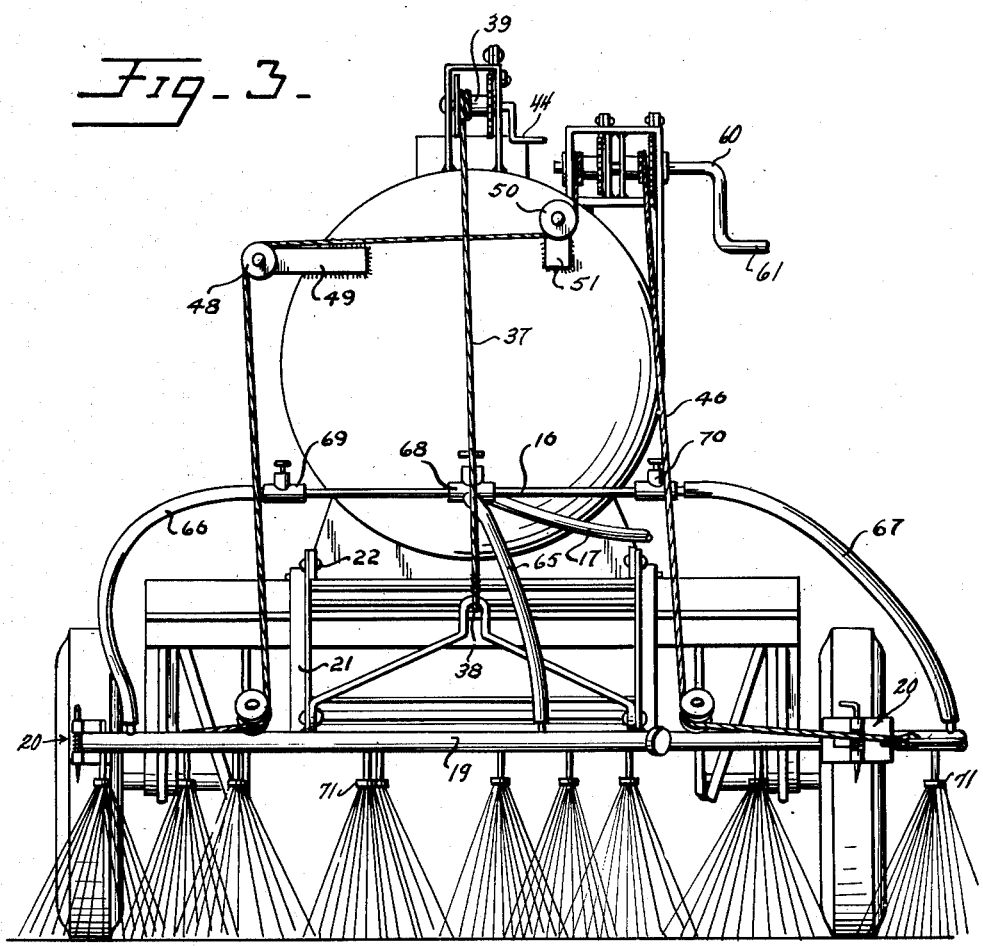
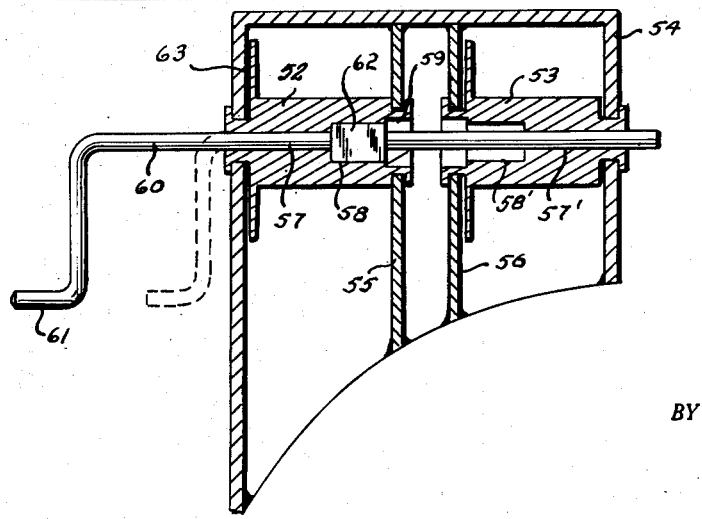

June 9, 1953 M. VALOIS 2,641,505
POWER SPRAYER FOR CHEMICAL HERBICIDES
Filed Dec. 3, 1948 5 Sheets-Sheet 4
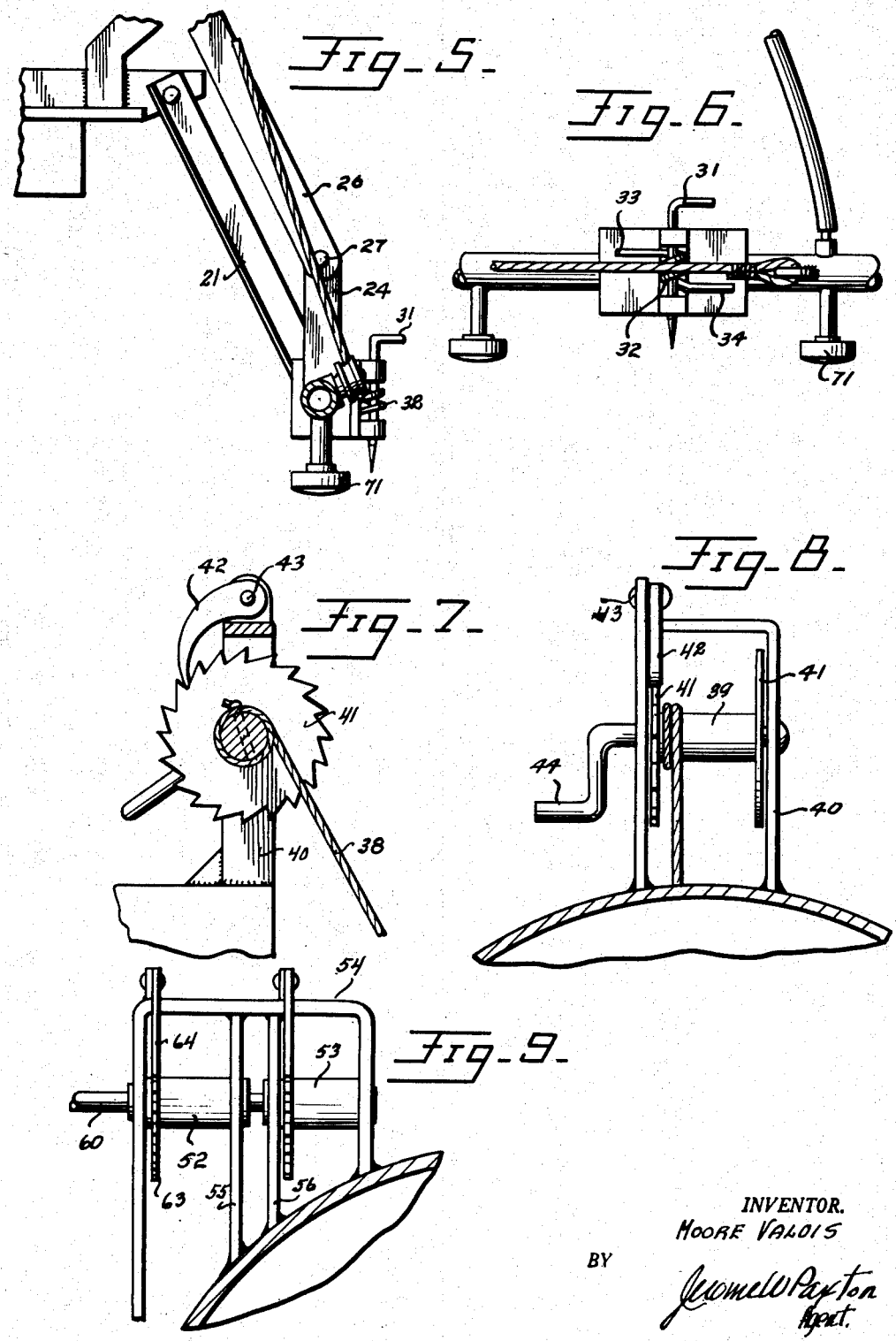
INVENTOR.
MOORE VALOIS
BY
Jerome W Paxton
Agent.

June 9, 1953　　　　　M. VALOIS　　　　　2,641,505
POWER SPRAYER FOR CHEMICAL HERBICIDES
Filed Dec. 3, 1948　　　　　　　　　　　5 Sheets-Sheet 5
Fig-10-
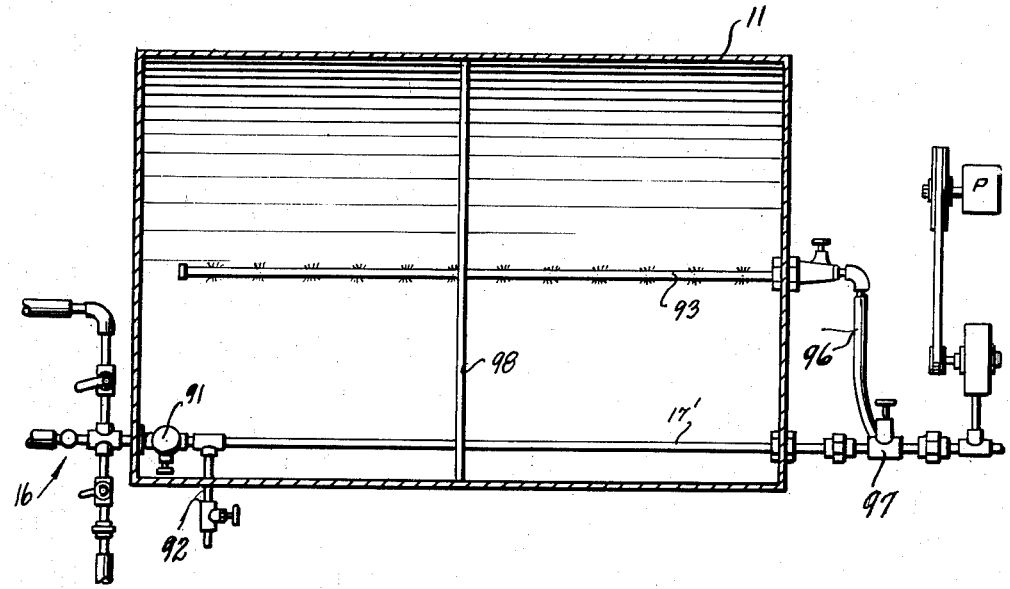
Fig-11-
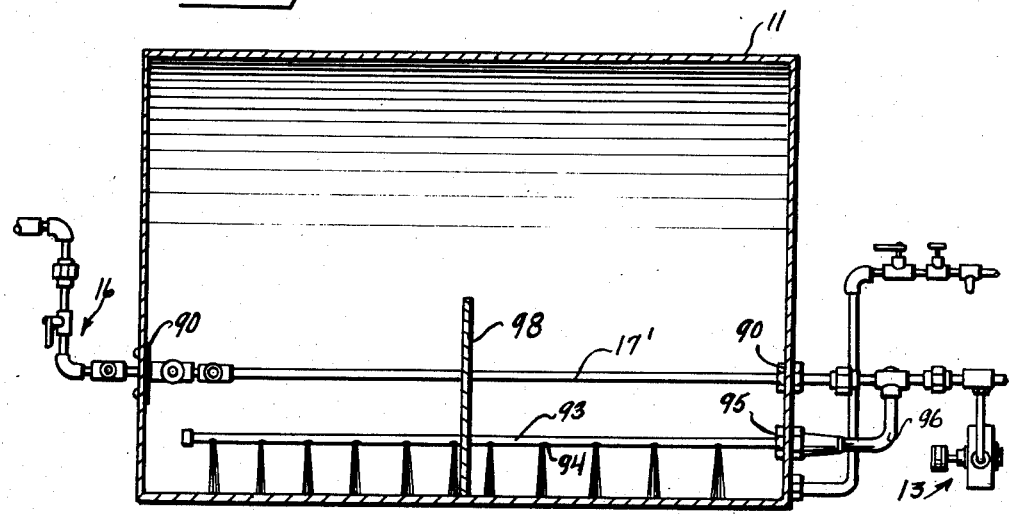
INVENTOR.
MOORE VALOIS
BY
Jerome W Peyton
Agent.

Patented June 9, 1953

2,641,505

UNITED STATES PATENT OFFICE 2,641,505

POWER SPRAYER FOR CHEMICAL HERBICIDES

Moore Valois, Napoleonville, La.

Application December 3, 1948, Serial No. 63,383

3 Claims. (Cl. 299—42)

The present invention relates broadly to an agricultural spraying machine, and more specifically is directed to a mobile unit for applying chemical herbicides for the control of weeds, grasses and the like.

The use of chemical herbicides for the control of undesirable weeds in crop land, pastures, drainage and navigable streams, along railroads and other places has recently met with great favor throughout the United States and other countries as the best process to accomplish the desired ends. Its popularity has progressed so rapidly that at the present time there are practically no machines for applying the herbicide available which will properly distribute the chemical weed killers. I am, of course, aware that there are numerous spraying machines employed at the present time for applying liquid insecticidal or fungicidal preparations to vegetation, but such machines are not satisfactory for use with chemical herbicides.

In general, these insecticidal spraying machines have included a mobile frame having mounted thereon a supply tank which is connected by conduits with a boom supported by the frame at one end thereof, the boom being adjustable vertically relative to the surface being traversed and, in addition, the boom is sectional, the outer sections being mounted for upward pivotal movement relative to the center section, whereby the sprayer may pass through gates or other narrow passageways. At first glance it may appear that this type of spraying machine could be employed, but such is not the case, since the distribution of chemical herbicides presents problems entirely different from those which confront effective insecticidal spraying. A chemical herbicide must be sprayed from a point above the top of the weeds or grass that are to be destroyed, and the nozzles for distributing the herbicide must be carried by the boom at the same elevation. Additionally, the boom must be so constructed that the boom throughout its entire length can be raised or lowered in such a manner that the spray nozzles will all be at the same height above the ground level even though the machine is moving along the ground. Additionally, the outer boom sections must be pivotally mounted to the center section so that when they are moved about their pivots, the position of the nozzles relative to the surface will not be changed or, in other words, that the spraying nozzles carried by the entire boom will remain at the same height above the weeds.

Manifestly, with a spraying machine wherein the outer boom sections pivot upwardly with respect to the fixed section, the nozzles carried by the outer sections will immediately be located at different elevations above the ground level which, of course, is highly undesirable for the application of chemical herbicides.

Accordingly, a salient object of the present invention is to provide a machine which will effectively apply the chemical herbicides to the weeds.

Another object of my invention is to provide a chemical herbicide spraying machine wherein the spraying boom may be easily and quickly adjusted relative to the ground and wherein the spraying nozzles associated with the boom are always at the same height relative to the ground.

Yet another object of my invention is to provide a machine of the character described wherein the boom comprises a center section having an outer section pivotally attached to each extremity of the center section in such a manner that the outer sections fold rearwardly with respect to the center section on a horizontal plane.

Still another object of my invention is to provide a boom assembly for use with herbicide spraying machines wherein the outer boom sections are pivotally mounted to the center section so that each of the outer sections may be moved to any desired angular position relative to the center section and maintained in such angular position.

And another object of my invention is to provide means easily accessible to the operator of the machine whereby the outer boom sections may be moved to any desired position relative to the stationary or center boom section, and further means for raising or lowering the entire boom relative to the ground.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 2 is a view in side elevation of the machine shown in Figure 1.

Figure 3 is an end view looking toward the rear of the machine shown in Figures 1 and 2.

Figure 4 is a sectional view taken along the line 4—4 of Figure 1, looking in the direction of the arrows, but being on an enlarged scale.

Figure 5 is a view taken along the line 5—5 of Figure 1, looking in the direction of the arrows, but being on a somewhat enlarged scale.

Figure 6 is a view taken along the line 6—6 of Figure 1, looking in the direction of the arrows, but being on a slightly enlarged scale.

Figure 7 is a sectional view taken along the line 7—7 of Figure 1, the view being taken in the direction of the arrows.

Figure 8 is a view taken along the line 8—8 of Figure 1, looking in the direction of the arrows, but being on a somewhat enlarged scale, and Figure 9 is a view taken along the line 9—9 of Figure 1, looking in the direction of the arrows, but being on a somewhat enlarged scale.

Figure 10 is a horizontal sectional view of the supply tank showing the liquid pressure agitator assembly for the tank.

Figure 11 is a vertical sectional view of the tank showing the manner in which the liquid pressure agitator directs the herbicide to prevent sediments from accumulating at the bottom of the tank.

Figure 1:
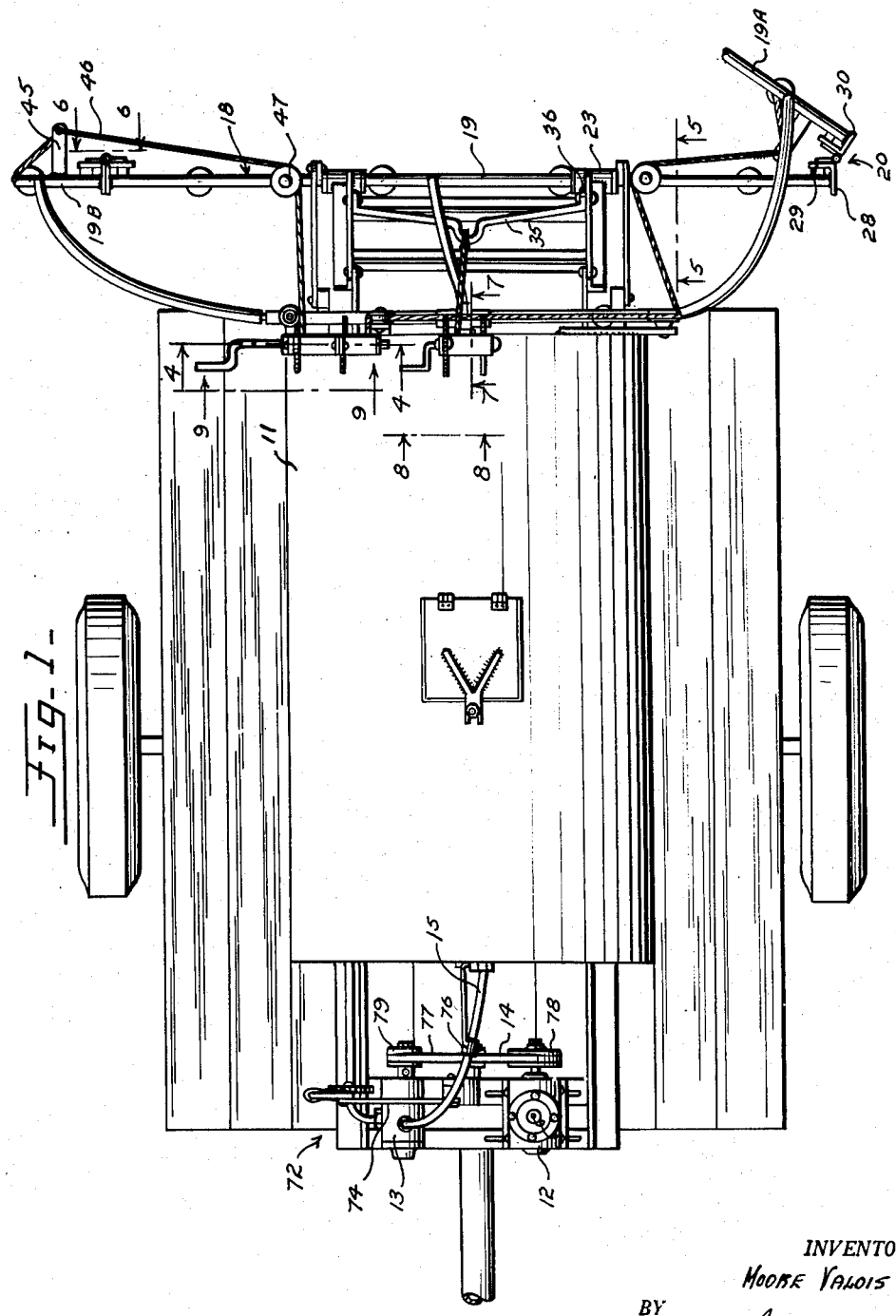
Figure 1 is a top plan view of a spraying machine constructed in accordance with my invention.

Viewing the invention broadly, it includes a wheeled frame which supports a supply tank, there being a source of power on the frame for driving a gear pump whereby the herbicide in the tank is forced through suitable conduits to nozzles carried by an adjustable boom mounted preferably at the rear end of the frame. The adjustable boom includes a central section mounted for upward and downward pivotal movement relative to the frame and being of a length substantially equal to the width of the frame. An outer boom section is attached at each end of the center section for pivotal movement about the vertical axis, whereby the outer boom sections may be maintained in the same plane as the fixed or center section and yet be capable of assuming various angular positions relative to the fixed section. Control means for moving the fixed section about its pivot and additional means for moving the outer booms about their pivots are provided at a point readily accessible to the operator.

The boom in its entirety will always maintain the spraying nozzles associated therewith at the same elevation above the ground, and suitable linkage is provided to assure that the spraying nozzles will always be directed downwardly relative to the ground, regardless of the position of the boom.

Referring to Figures 1 and 2, I have shown a wheeled vehicle such as a trailer 10, on which is mounted a supply tank 11, a source of power 12, a gear pump 13, drive connection 14 between the power source and the pump, hose connection 15 between the tank and the pump, discharge manifold 16, conduit 17 between the pump and the manifold, and boom assembly 18 connected with the manifold for directing the herbicide onto the vegetation being treated.

The boom assembly 18, which is one of the salient features of the invention comprises a tubular center section 19 and outer tubular sections 19A and 19B pivotally mounted to each end of the center section, as indicated generally 20, in such a manner that the sections 19A and 19B may fold horizontally rearwardly with respect to the center section. Intermediate the ends of the center section 19 a pair of spaced apart angle irons 21 are pivoted at their upper ends to the frame of the vehicle, as indicated by the numeral 22, whereas the lower or free end of each arm supports a sleeve 23, through each of which the center section 19 extends and is capable of rotary movement relative to the sleeves. An arm 24 is brazed, welded or otherwise secured to the center section adjacent to each sleeve 23 and extends upwardly therefrom. An elongated link 26 is hingedly connected to the upper end of the arm 25, as shown at 27, and the other end of the link may be attached to the side of the tank 11 at a point above the frame of the vehicle. As will later be more readily apparent, the purpose of the arm and link is to insure that the discharge nozzles will always be directed vertically downward, regardless of the position of the boom 18. While I have shown the use of two arm and link arrangements, it is, of course, apparent that but a single assembly may be employed.

The pivotal mounting 20 includes an angle bracket 28, one flange of which is attached to the end of the center section 19, whereas the other flange is located substantially parallel to the section and fixed thereto, as indicated at 29. The inner end of each of the sections 19A and 19B is provided with a similar angle bracket 30 and this bracket is attached to the section in the same manner as the bracket 28. The brackets are constructed to provide a leaf hinge and pin 31 is surrounded by a spring 32, one free end 33 of which engages the flange of the bracket 28, whereas the opposite free end 34 contacts the flange of the bracket 30. Manifestly, the spring 32 will tend to maintain the outer sections in alinement with the center section 19 and yet permit the sections to be moved rearwardly relative to the center section.

In order to either raise or lower the boom 18, a hanger 35 is suitably attached to the angle irons 21A, as shown at 36, and one end of a cable 37 is attached to the hanger, as indicated at 38. The opposite end of the cable is secured to a spool 39 which is journaled in a substantially U-shaped bracket 40 conveniently secured to the top of the tank 11. The spool shaft supports a ratchet wheel 41, the teeth of which cooperate with a dog 42 pivoted to the bracket, as shown at 43. A crank or handle 44 is operatively connected with the spool shaft for turning the spool to raise the boom 18 upwardly to the desired elevation and, of course, the dog 42 while engaging the teeth of the ratchet 41 will prevent retrograde movement of the spool. It is apparant that to lower the boom, it is merely necessary to remove the dog from engagement with the teeth and the weight of the boom will lower the boom about its point of pivot to the frame.

In order to move either or both of the outer sections 19A and 19B angularly with respect to the center section 19, I provide an arm 45 which is secured to the outer section at approximately 90 degrees to the section adjacent the pivotal mounting 20. A cable 46 is attached to the outer end of the arm and is trained around pulley 47 suitably attached to the center section 19 adjacent to the sleeve 23. The cable 46 is then trained over pulley 48 carried by a bracket 49 attached to the rear end of the tank 11, around pulley 50 which is supported on mounting 51 also on the tank 11, and the free end is attached to a spool 52. The cable 46 associated with the section 19B extends directly from its pulley 47 to spool 53. As shown in Figure 4, a supporting frame 54 is welded to the tank and is provided with a pair of spaced partitions 55 and 56 which extend between the top of the bracket and the tank and secured to the respective members by brazing or the like. The ends of the spool 52 are journaled in the side wall of the bracket and the partition 55, whereas the spool 53 is rotatably mounted at one end to the partition 56 and at its other end to the other side wall of the bracket. The spool 52 is provided with a longitudinally extending bore 57 which merges with an enlarged recess 58 of square configuration and which, in turn, communicates with a larger recess 59 at the inner end of the spool. The spool 53 is similarly formed and the same numerals are applied with the exception that they are primed. An operating shaft 60 having a handle 61 is adapted to extend through the bores 57 and 57' of the spools 52 and 53, and it will be observed that the shaft carries a square enlargement 62 intermediate the ends thereof. By virtue of this arrangement, the operator may rotate either one of the spools 52 or 53 to move the respective boom section about its pivot mounting. For instance, in Figure 4 the operating shaft 60 has been moved to a point where the enlargement 62 is seated in the recess 58, whereupon rotation of the shaft by the handle 61 will wind the cable 46 connected to the boom section 19A, thereby moving such section about the pivot 20 to the angular position desired.

To prevent retrograde movement of the spools 52 and 53, each of the spools supports a ratchet wheel 63, and a pivoted dog 64 carried by the bracket is adapted to engage the teeth of the ratchet. If it is desired to wind the cable on the spool 53, the shaft 60 is moved longitudinally until the enlarged portion 62 is seated in the recess 58' of the spool, whereupon rotation of the handle will wind the cable 46 connected to the boom 19B thereon.

The manifold 16 is connected to the center section 19 and the outer sections 19A and 19B by flexible conduits 65, 66 and 67 and control valves 68, 69 and 70 are provided for regulating the flow of herbicide to the respective sections. Consequently, the operator can easily arrest the flow into any one of the sections by the manipulation of the necessary valve or valves. Each of the pipe sections is provided with a plurality of spray nozzles 71 of any desirable type, and while I have ascertained that the best results are accomplished by employing five nozzles for each section, it is possible that a more or less number may be employed.

During operation in the field, it is sometimes necessary to stop the operation of the pump 13 temporarily, and in order not to stop the power plant 12, I provide a clutch mechanism indicated generally 72. It will be noted that pivoted hand lever 73 is connected by means of a link 74 to an arm 75 which supports an idler pulley 76 bearing against drive belt 77 trained over pulleys 78 and 79 associated with the power plant and pump 13, respectively. By the use of this construction, it is possible to stop the action of the pump 13 and hence the spraying process without stopping the motor, and this is a most desirable feature. Additionally, the power plant can be started with the clutch off, thereby giving the engine sufficient time to warm up before the pump 13 becomes effective.

To raise the boom assembly 18, the operator turns the handle 44 to wind the cable 37 thereon, whereupon the hanger 35 will move the angle irons 21 upwardly about their pivots, thus elevating the boom 18. As previously mentioned, it is essential that the nozzles 71 be directed downwardly during the spraying process and as the boom is elevated, there is a tendency for the nozzles to point backwardly. However, the link 26 will push outwardly against the arm 25 which, in turn, will rotate the section 19 in the sleeves 23 and bring the nozzles 71 into a perfect downward position. On the other hand, assuming that the boom is being lowered, there is a tendency for the nozzles to be directed forwardly, but the link 26 will pull the arm 25 which will turn the boom and once more position the nozzles 71 vertically. This arrangement is particularly efficacious, in that it is unnecessary for the operator to make any manual adjustments of the boom and thereby overcome the considerable loss of time in effecting the necessary adjustments, since with this arrangement the adjusting arm will always insure that the nozzles will be kept in a vertical position, regardless of the position of the boom relative to the surface being traversed.

It is thought that it will be readily apparent to one skilled in the art that the herbicide will be drawn from the tank through the line 15 into the pump 13. The line 15 is provided with a suitable cut-off valve and a filter of conventional type is interposed in the line intermediate the tank and the pump. The pump, of course, serves to direct the spray through the conduit 17 into the manifold 16 and the flow into the boom sections 19, 19A and 19B may be controlled by the valves 68, 69 and 70.

The present machine, as above indicated, has been designed for the application of herbicides to control undesirable weeds and grasses, particularly in sugar cane and rice fields, along ditches, canals, roadsides and pastures. The boom assembly herein described is readily adaptable to any problem which may be encountered and the flow of herbicide to any one of the boom sections may be controlled by the manipulation of the proper valve associated with the manifold 16. By having the outer sections mounted to the center section in the manner shown, either or both of the sections may be moved about the pivots to the center section, such as in passing through comparatively narrow fence openings and the like, and, in addition, the spring means 32 will permit the outer sections to pivot in the event trees, stumps or other objects are in the line of travel, thereby overcoming any danger of these sections becoming broken upon encountering such objects.

Of course herbicides do not require the agitation which is true of insecticides and other type sprays, but it is advisable to have some agitation in order to prevent sediments from accumulating at the bottom of the tank. To accomplish this end, I have shown in Figures 10 and 11, a liquid pressure agitator which may be driven through the power source and which does not require any moving parts for efficient operation. It will be noted that conduit or supply line 17' connecting the manifold 16 with the pump 13 extends longitudinally of and within the tank 11 and the conduit is provided with leak-proof seals 90 at the points where the conduit extends through the end walls of the tank. The conduit may be provided with a ball valve 91 and a cut-off valve 92 at the end adjacent to the manifold 16, for the usual purposes.

A pipe 93 having spaced discharge ports 94 along the bottom thereof is secured at one end in the end wall of the tank by any suitable leakproof means 95 and is of such length as to extend substantially the length of the tank at a point in relatively close proximity to the bottom of the tank. The pipe is connected by means of a conduit 96 to a pressure regulator 97 of the spring type release which is interposed in the conduit 17' between the tank and the pump 13.

If desired, a baffle plate 98 may be secured to the bottom wall of the tank for the customary purposes.

For ideal operation, I have found that the pump should have a pump capacity of 10 gallons per minute, although most herbicides are applied in volumes requiring between 2 and 6 gallons per minute. Hence, by operating the pump to apply the herbicide at, for example, 5 gallons per minute, there is an excess volume of 5 gallons per minute. By diverting this excess volume through the pressure regulator 97 into the conduit 96 and thence into the pipe 93, the herbicide directed through the ports 94 will thoroughly agitate the herbicide within the tank, thus preventing sediments from accumulating at the bottom of the tank.

This is a very simple arrangement and varying pressures can be achieved by manipulation of the regulator 97.

I claim:

1. In a power sprayer for chemical herbicides, a mobile frame, a tank for the herbicide disposed upon the frame, a center boom section pivotally attached for upward and downward movement relative to the frame, an outer boom section pivoted to each end of the center boom section for horizontal swinging movement relative to the center boom section, means defining discharge outlets in each of said boom sections, spring means normally maintaining each of said outer boom sections in horizontal alinement with the center boom section, means operatively connected with the center boom section to move the center boom section about its pivot to the frame, a pair of spools rotatably mounted upon said tank, a cable extending from one of said outer boom sections to one of said spools, a second cable extending from the other of said outer boom sections to the other of said spools, and an operating device associated with said spools to rotate either or both of said spools to wind the cable thereon to move either or both of the outer boom sections about their pivots.

2. A power sprayer as defined in and claimed by claim 1 further characterized in that means is provided to rotatably support said center boom section, said means defining the discharge outlets being directed downwardly and a linkage between the center boom section and the mobile frame serves to maintain said discharge outlets downwardly during the upward and downward movement of the center boom section.

3. A power sprayer as defined in and claimed by claim 2 further characterized in that means is provided to maintain each outer boom section in the desired angular position with respect to the center boom section.

MOORE VALOIS.

References Cited in the file of this patent

UNITED STATES PATENTS

| Number | Name | Date |
|---|---|---|
| 533,577 | Ainger | Feb. 5, 1895 |
| 999,676 | Schoelles | Aug. 1, 1911 |
| 1,629,160 | Hermance | May 7, 1927 |
| 1,634,701 | Williams | July 5, 1927 |
| 1,887,092 | Glase | Nov. 8, 1932 |
| 2,132,727 | Foote | Oct. 11, 1938 |
| 2,149,112 | Brandt et al. | Feb. 28, 1939 |
| 2,193,338 | Magnuson | Mar. 12, 1940 |
| 2,210,346 | Stayton | Aug. 6, 1940 |
| 2,273,344 | Black et al. | Feb. 17, 1942 |
| 2,481,733 | Elias | Sept. 13, 1949 |
| 2,499,909 | Fox | Mar. 7, 1950 |
| 2,541,417 | Hartsock | Feb. 13, 1951 |

FOREIGN PATENTS

| Number | Country | Date |
|---|---|---|
| 683,141 | France | Feb. 24, 1930 |